INVENTOR.
JEAN C. LEJON
BY
John F. Luhrs
ATTORNEY

United States Patent Office 3,510,841
Patented May 5, 1970

3,510,841
INTERROGATION SYSTEM FOR TRANSMITTING MEASUREMENTS WITH TIME-DIVISION MULTIPLEXING
Jean C. Lejon, Paris, France, assignor to Controle Bailey (Societe Anonyme), a French company
Filed June 2, 1967, Ser. No. 643,213
Claims priority, application France, June 8, 1966, 64,701
Int. Cl. H04q 9/14
U.S. Cl. 340—151　　　　　　　　　　　　　　　4 Claims

ABSTRACT OF THE DISCLOSURE

A system for transmitting measurements of physical quantities from a plurality of remotely located transponders to a central receiver station over a single transmission line is disclosed. A single interrogation pulse from the central receiver station triggers each transponder in sequence. Each transponder station upon being triggered transmits to the receiver station over the transmission line a signal corresponding in value to the measurement of the physical quantity to which the transponder is responsive.

BACKGROUND OF THE INVENTION (a) This invention lies in the field of electric data logging systems.

(b) Presently available data logging systems require individual transmission lines from each transponder to the central receiving station.

SUMMARY OF THE INVENTION

A system of measurements with time-division multiplexing comprising, at the central station, means for transmitting interrogation pulses over a single line, and means for demodulating frequency-modulated response pulses, and, at each station, means for receiving the interrogation pulse, for delaying it by a predetermined increment of time and for re-transmitting it over the line toward the next station, a variable-frequency pulsed oscillator, means for varying the frequency of the pulsed oscillator as a function of the value of a measurement, means for applying the interrogation pulse to said pulsed oscillator as a trigger pulse, means for applying to the transmission line the pulse at the measuring frequency supplied by the pulsed oscillator during its release time and bypass means enabling two channels to be defined in parallel in the station, one of which is used by the un-modulated interrogation pulses and the other of which is used by the frequency-modulated measuring pulses.

In order to escape from the stability conditions for the oscillators, the invention provides that the interrogation pulses have two different consecutive portions (for example, different polarity portions), that the normal measuring pulse is triggered and transmitted backwards in the transponder station as stated on reception of the first portion of the interrogation pulse while the second portion of the interrogation pulse cuts off the measuring apparatus from the pulse oscillator and causes the transmission by the latter of an additional meauring pulse which may be called the zero measuring pulse. The central station, therefore, knows if the zero has varied and if so, can effect the measurement corrections resulting therefrom.

DESCRIPTION OF THE PREFERRED EMBODIMENT

Figure 1:
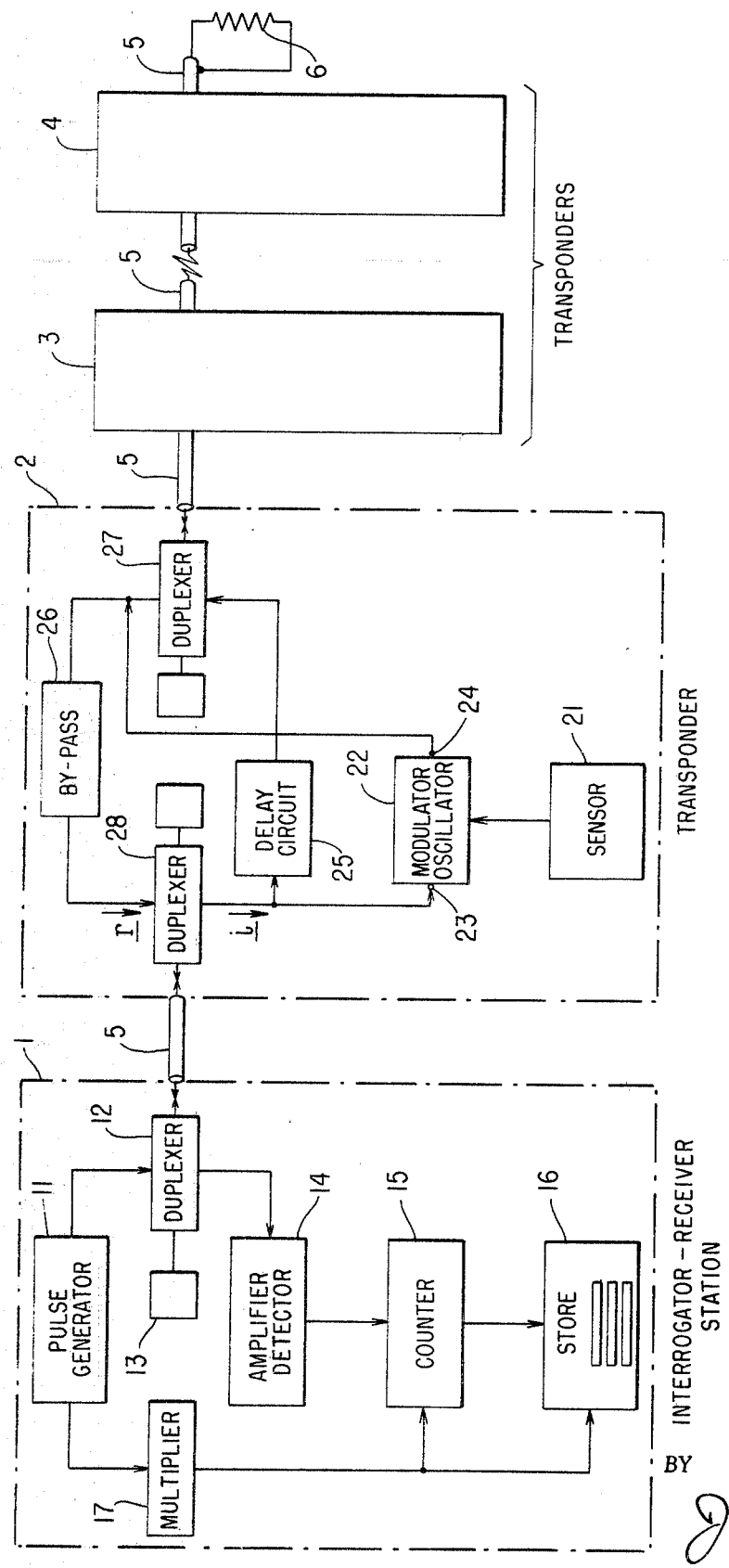
FIG. 1 illustrates, in the form of a block diagram, the measurement transmission system of the invention.

Referring to FIG. 1, there is illustrated an interrogator-receiver station 1, a plurality of transponder stations 2, 3, 4 joined by a single transmission line 5 to which they are connected in cascade, and a terminating load 6 for the transmission line adapted to the characteristic impedance of the latter. The transmission line may, for example, be a coaxial line having a characteristic impedance of 50 ohms.

The interrogator-receiver station 1 comprises a pulse generator 11 which transmits interrogation pulses of a certain polarity or, as will be seen hereinafter, successive pairs of pulses of opposite polarity. This generator 11 is connected to the transmission line 5 through the transmit input of a duplexer 12. This duplexer may, for example, be a hybrid transformer followed by a balancing network 13. The receive output of the duplexer 12 is connected to an amplifier-detector 14, then to a counter 15 and to a memory 16 containing as many display registers as there are transponder stations in the measuring system.

The transponder stations 2, 3, 4 are all identical and only one of them will be described, the transponder station 2. In this station, there is a sensor 21 to which there is applied the phenomenon to be measured and a variable-frequency oscillator 22, the transmission frequency of which is controlled by the sensor. The sensor 21 may, for example, be a variable-inductance or variable-capacitance detecting element, the inductance or the capacitance of which are connected in series or in parallel with the oscillating circuit of the oscillator. Or the sensor may produce a variable output voltage which is applied to a variable-capacity diode to cause the capacity thereof to vary. The oscillator 22 has a release terminal 23 to which there is applied the interrogation pulse and an output terminal 24 at which the response pulse appears. The transponder station 2 includes a delay circuit 25 connected in series with the transmission line. This delay circuit 25 may be of different known types according to the value of the delay which it is desired to introduce into each transponder station in the transmission of the interrogation pulse. This delay circuit may, for example, be a delay line with inductances in series and capacitors in parallel, or a monostable trigger circuit, or a magnetostriction line. As explained above, the delay introduced by each delay circuit of a transponder is at least equal to the duration of an interrogation pulse in order that the response pulses may not overlap in time and may be separated by guard intervals.

It is possible to adjust the level of the modulated response pulses with respect to the un-modulated interrogation pulses in such a manner that only the latter start the frequency-modulated pulse oscillators, but nevertheless it is preferable for the delay circuits only to allow through the un-modulated interrogation pulses to the exclusion of the modulated response pulses.

Each transponder station further includes a bypass circuit 26 in parallel with the terminals of the delay circuit 25 through which the modulated response pulses are to pass to the exclusion of the un-modulated interrogation pulses.

The separation of the interrogation pulses and response pulses respectively between the channels constituted by the circuits 25 and 26 may be effected in various manners. In the first place, it is possible, as illustrated in FIG. 1, to place in parallel, at each side of the circuits 25 and 26, duplexers 27 and 28 which are appropriately connected in such a manner that the direction of the interrogation pulses is that of the arrow $i$ and the direction of the response pulses is that of the arrow $r$. The output 24 from the frequency-modulated oscillator 22 is then connected, in each transponder, to the return channel of the duplexer 27 and the release input 23 of said oscillator is connected to the outgoing channel of the duplexer 28.

The separation may likewise be effected on a frequency base, the cut-off frequency of the delay circuit 25 being sufficient to allow the interrogation pulse to pass according to its duration (and its waveform) but insufficient to allow the carrier frequency of the response pulse to pass. In other words, the delay circuit is a low-pass filter and the bypass circuit is a high-pass filter. By way of example, if it is supposed that the measuring system comprises sixty-four transponders, that the complete interrogation and response cycle lasts one second, that the interrogation pulses and response pulses have a duration of 7.5 milliseconds and are separated by guard intervals of 7.5 milliseconds, a quite correct transmission of the un-modulated pulses will be obtained by taking 10 kc./s. as the cut-off frequency of the delay circuit. The carrier frequency may then be taken as 100 kc./s. for example.

The operation of the system is as follows. The interrogation pulse is transmitted cyclically or at the intervention of an operator to all of the transponders in cascade and it is delayed for a predetermined increment of time at each transponder by passing through the delay circuit of said transponder. This interrogation pulse triggers the oscillator 22 of the transponder to which it is applied through its release terminal 23. The response pulse is applied to the input of the bypass channel 26 and passes through all the other bypass channels of the transponders between the interrogator-receiver station 1 and the transponder station in question. In the interrogator-receiver station 1, the response pulse is diverted to the amplifier-detector 14; the pulses resulting from the detection are counted in the counter 15, which may be binary or decimal, then transferred to the memory 16 having a plurality of input registers. The transfer and passage from one register to the following in the memory 16 are controlled by control pulses derived from the interrogation pulse by a multiplier 17, the multiplication factor of which is equal to the number of transponder stations.

Figures 2, 3:
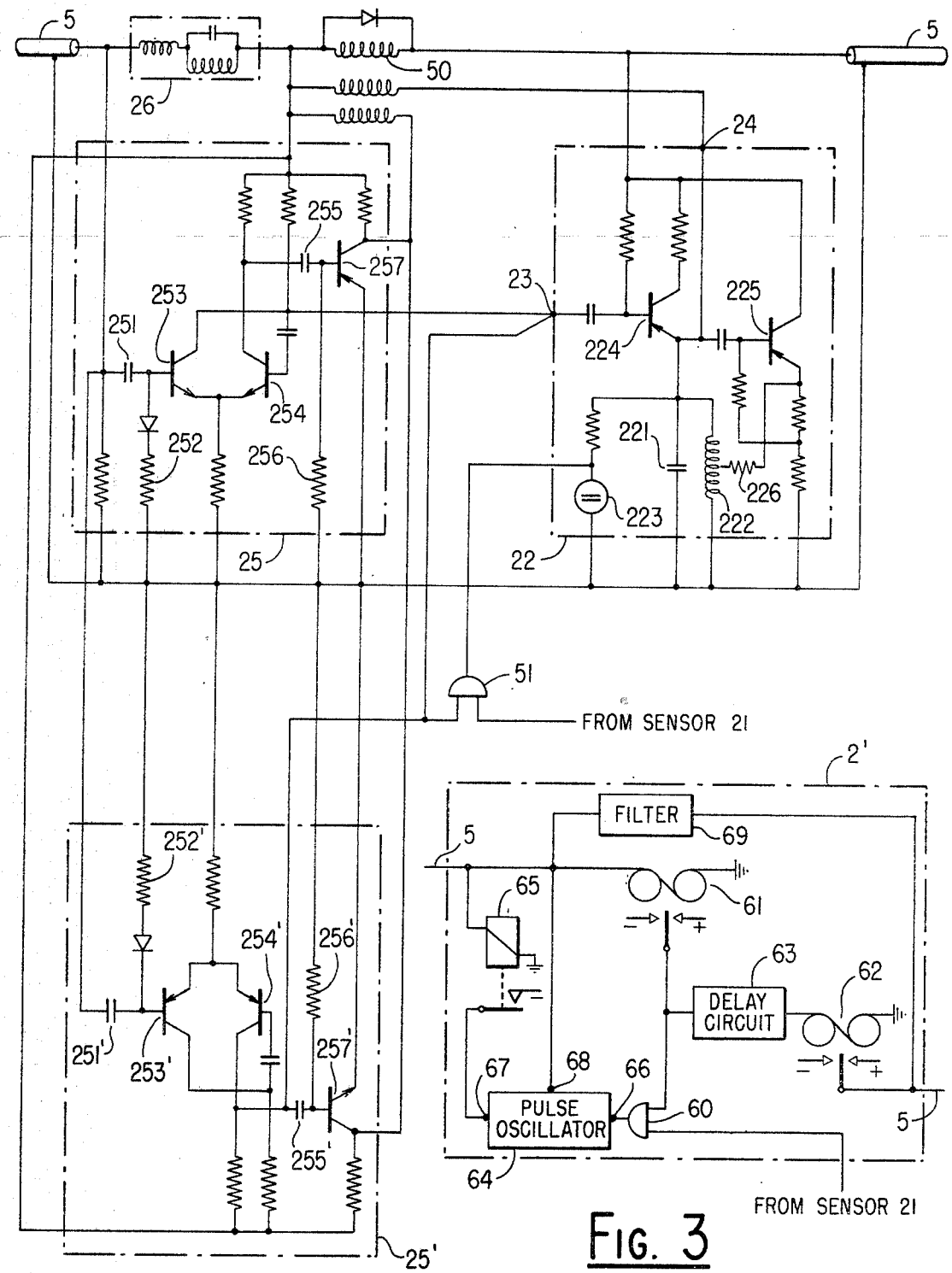
FIG. 2 is a detailed electrical diagram of a first type of transponder station.
FIG. 3 is a detailed electrical diagram of a second type of transponder station.

FIG. 2 gives an example of the structure of a transponder station. Needless to say there are a very large number of circuits which may be suitable as a delay circuit 25, as a bypass circuit 26, and as an oscillator 22. In FIG. 2, by way of example, a monostable trigger circuit has been selected as a delay circuit and a Hartley oscillator as a pulse oscillator. On the other hand, the duplexers 27 and 28 have been eliminated, the switching of the interrogation pulses and response pulses being effected on a frequency base.

The delay circuit 25 comprises a differentiator circuit composed of the capacitor 251 and the resistor 252 of sufficiently low values to produce a brief pulse coinciding with the beginning of the interrogation pulse, a monostable trigger circuit with coupled emitters composed of the transistors 253 and 254 and a second differentiator circuit composed of the capacitor 255, of the resistor 256 and of the inverter transistor 257. The positive pulse thus obtained at the collector of this transistor is applied to the transmission line 5 through the pulse transformer 50.

The bypass circuit 26 is a band-pass filter, the central frequency of which is equal to the carrier frequency of the pulse oscillator and is higher than the upper limit of the frequency band corresponding to the spectrum of the interrogation pulse. If the duration of the interrogation pulse is 100 microseconds for example, the carrier frequency may be taken equal to 1 mc./s.

The oscillator is of the Hartley type. It is well known in the art and it is described, for example, in the book by Jacob Millman and Herbert Taub, McGraw-Hill Book Company, 1956, p. 505. The transistor 225 is a feedback transistor and the resistor 226 serves to control the feedback. The oscillating circuit comprises the capacitor 221, the inductor 222 and the variable-capacity diode 223, the control voltage of which is supplied by the detecting element or sensor 21.

The release pulse is taken off at the output of one of the transistors of the monostable trigger circuit 253–254. The variable-frequency signal modulated by the release pulse is applied to the second primary winding of the pulse transformer 50.

As stated at the beginning, and in order to avoid having very stable pulse oscillators, the invention provides for the interrogation of the transponder stations by two consecutive pulses, one of which is positive and the other negative. The first causes a response pulse frequency modulated by the quantity to be measured as described hitherto; the second cuts off the measuring signal at the input to the oscillator and the response pulse transmitted then corresponds to the zero of the measuring apparatus or of the detecting element. In other words, the frequency corresponding to the actual zero is transmitted at every measurement; it follows that the drift of the oscillator is not a cause of error in the measurement.

Referring again to FIG. 2, the transponder station comprises a second monostable trigger circuit and differentiator 25' similar in every way to the circuit 25, except that the transistors are there of the opposite type. The reference numerals for the elements of 25' are the same as those for the elements of 25 but with a prime. The trigger circuit is controlled by negative pulses and the differentiator circuit which follows it applies negative pulses to the transmission line. The release pulse for the pulsed oscillator 22 is taken from the collector of the transistor 254' (and not 253') because it must be negative. This same release pulse for the oscillator is applied as a blocking pulse to a gate circuit 51 which is interposed between the sensor 21 of the transponder station and the variable-capacitance diode 223.

In the case where the interrogation pulses have a sufficiently long duration, for example 10 to 20 milliseconds, the transponder stations may comprise electro-mechanical relays.

Referring to FIG. 3, the transponder station 2' comprises a first polarized receive relay 61, the armature of which is connected to the windings of a second polarized retransmit relay 62 by means of a delay circuit 63. The incoming line 5 is connected to the windings of the relay 61 and the outgoing line is connected to the armature of the relay 62. The gate circuit 60, interposed between the sensor 21 (not illustrated) and the terminal 66, controlling the frequency of the pulse oscillator 64 is connected to the armature of the polarized relay 61. The gate circuit 60 is blocked when the interrogation pulse is negative, for example.

The incoming line 5 is likewise connected to a non-polarized relay 63 which attracts its armature when the incoming line is at a different potential from that of earth. This armature applies to the release input 67 of the pulse oscillator 64, a pulse of the polarity required to release it. The output terminal 68 of the oscillator at which the high-frequency pulse appears is connected to the incoming line 5. Apart from this, the incoming and outgoing lines are connected by a filter 69 tuned to the central frequency of the oscillator 64.

Needless to say, the voltages necessary for the active elements of the transponder stations may be supplied through the measuring line itself, as is well known in the art of cable repeaters.

What is claimed is:

1. System for transmitting measurements with time-division multiplexing from transponder stations to an interrogator-receiver station connected therebetween by a single channel, comprising, at the interrogator-receiver station, means for transmitting interrogation pulses over said channel and means for demodulating frequency-modulated response pulses, and, at each transponder station, means for receiving the interrogation pulses, for delaying them by a predetermined increment of time and re-transmitting them over said channel, a variable-frequency pulse-oscillator, means for causing the frequency of said pulse-oscillator to vary as a function of the value of a measurement, means for applying the interrogation pulses to said pulse-oscillator as release pulses, means for applying to said channel the pulses at the measuring frequency supplied by the pulse-oscillator during its release time, and bypass means enabling two channels to be defined in parallel in the transponder station, the one being used by the un-modulated interrogation pulses and the other being used by the frequency-modulated measuring pulses.

2. System for transmitting measurements with time-division multiplexing from responder stations to an interrogator-receiver station connected therebetween by a single channel, comprising, at the interrogator-receiver station, means for transmitting interrogation pulses over said channel and means for demodulating frequency-modulated response pulses, and, at each transponder station, first and second duplexers each having a transmit and receive terminal, a receive input and a transmit output, the transmit and receive terminals of said duplexers being connected to said channel and the transmit output of the second duplexer and the receive input of the first duplexer being interconnected, a delay line inserted between the transmit output of the first duplexer and the receive input of the second duplexer and a variable-frequency pulse-oscillator having a frequency control terminal adapted to receive a measurement signal, a release terminal connected to the transmit output of said first duplexer and an output terminal connected to the transmit output of said second duplexer.

3. System for transmitting measurements with time-division multiplexing from responder stations to an interrogator-receiver station connected therebetween by a single channel, comprising, at the interrogator-receiver station, means for transmitting interrogation pulses over said channel and means for demodulating frequency-modulated response pulses, and, at each transponder station, a low-pass filter having an input connected to the incoming channel in said responder station and an output, a high-pass filter having an input connected to the outgoing channel from said responder station and an output connected to said incoming channel, a delay line inserted between the output of the low-pass filter and said outgoing channel and a variable-frequency pulse-oscillator having a frequency control terminal adapted to receive a measurement signal, a release terminal connected to the output of said low-pass filter and an output terminal connected to the output of said high-pass filter.

4. System for transmitting measurements with time-division multiplexing from transponder stations to an interrogator-receiver station connected therebetween by a single channel, comprising, at the interrogator-receiver station, means for transmitting pairs of adjacent interrogation pulses of opposite polarity and means for demodulating pairs of adjacent frequency-modulated response pulses, and, at each transponder station, means for receiving the pairs of interrogation pulses, for delaying them by a predetermined quantity and re-transmitting them over said channel, a variable-frequency pulse-oscillator, sensor means for causing the frequency of said pulse-oscillator to vary under the control of said sensor means, means controlled by one of the pulses of the pair of interrogtion pulses for cutting-off the sensor means from the pulse-oscillator, means for applying the two interrogation pulses of the pair to said pulse-oscillator as release pulses, means for applying to said channel the response pulses supplied by the pulse-oscillator during its two release times due to the two interrogation pulses of the pair and bypass means enabling two channels to be defined in parallel in the transponder station, the one being used by the unmodulated interrogation pulses and the other being used by the frequency-modulated measuring pulses.

References Cited

UNITED STATES PATENTS 3,299,403   1/1967   Young _____ 340—151

HAROLD I. PITTS, Primary Examiner

U.S. Cl. X.R.

340—152, 163, 167, 171